United States Patent [19]

Knop

[11] Patent Number: 4,521,812
[45] Date of Patent: Jun. 4, 1985

[54] METHOD OF IMPROVING CONTRAST ACCENTUATION

[75] Inventor: Hans-Georg Knop, Heikendorf, Fed. Rep. of Germany

[73] Assignee: Dr.-Ing. Rudolf Hell GmbH, Kiel, Fed. Rep. of Germany

[21] Appl. No.: 435,255

[22] Filed: Oct. 19, 1982

[30] Foreign Application Priority Data

Oct. 19, 1981 [EP] European Pat. Off. ........ 81108501.8

[51] Int. Cl.³ .............................................. H04N 1/38
[52] U.S. Cl. .................................... 358/287; 358/284
[58] Field of Search .................. 358/284, 287, 80, 280

[56] References Cited

U.S. PATENT DOCUMENTS

| | | | |
|---|---|---|---|
| 2,691,696 | 10/1954 | Yule | 358/280 |
| 2,962,548 | 11/1960 | Taudt | 358/284 |
| 4,335,407 | 6/1982 | Atoji | 358/284 |
| 4,403,258 | 9/1983 | Balzan | 358/284 |
| 4,417,281 | 11/1983 | Hama | 358/287 |
| 4,437,122 | 3/1984 | Walsh | 358/284 |

FOREIGN PATENT DOCUMENTS 1772022 8/1970 Fed. Rep. of Germany .
1546359 5/1979 United Kingdom .

Primary Examiner—Howard W. Britton
Attorney, Agent, or Firm—Brisebois & Kruger

[57] ABSTRACT

This invention relates to a method for improving contrast accentuation in the case of the re-recording of originals in the sphere of electronic image processing by means of graving devices and scanners. An image signal is obtained by scanning an original opto-electronically dot-by-dot and line-by-line, and at least one surround signal is obtained by evaluating the surrounding area of the image dots. A correction signal which is superimposed on the image signal for the purpose of contrast accentuation is derived from the surround signal and the image signal. The original is thereupon re-recorded on a recording medium to an optional reproduction scale. The magnitude of contrast accentuation on the recording medium is adjusted by varying the width of overlap of the image signal and correction signal irrespective of the actual reproduction scale, In the case of enlargements in particular, troublesome border patterns on outlines are averted or at least reduced in such degree that they are no longer noticeable to the beholder.

10 Claims, 5 Drawing Figures

Fig.4A
Signal $u_k$ at the input of a threshold circuit
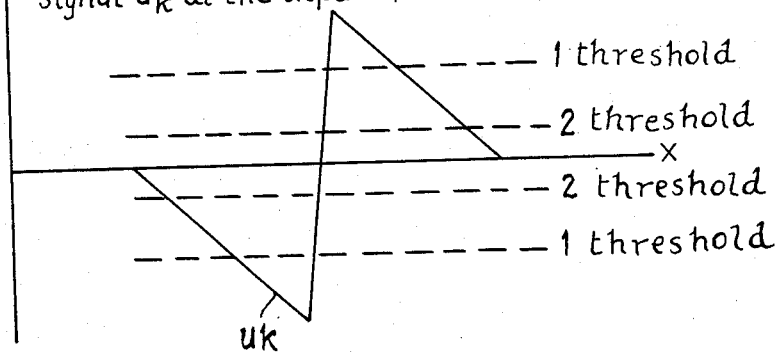
Signal $u'_k$ at the output of a threshold circuit
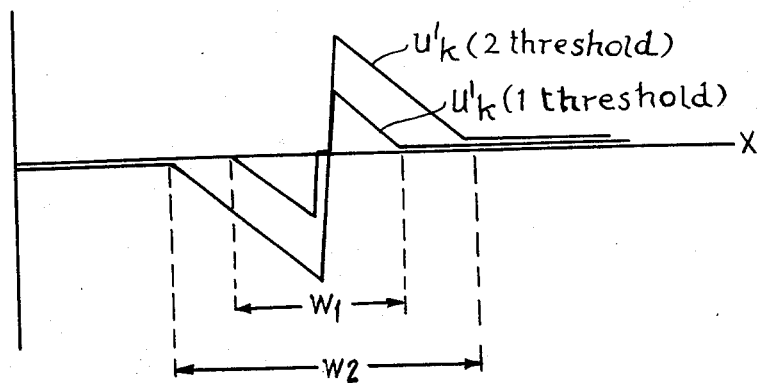
Fig.4B

METHOD OF IMPROVING CONTRAST ACCENTUATION

BACKGROUND OF THE INVENTION

The present invention relates to electronic reproduction techniques and to the production of printing blocks.

In electronic reproduction apparatus for producing printing blocks or plates, an original is scanned by dot-by-dot and line-by-line by means of an opto-electronic scanning element and the image signal obtained by doing so is corrected according to the requirements of the reproduction process. The corrected image signal controls a recording element which records the screen-based or screenless printing block on to a recording medium, if appropriate to a reproduction scale altered as compared to the original scanned.

A diminution of contrast perceived as blurring by the human eye occurs during the production of originals for scanning and due to the limited capacity of resolution of the opto-electronic scanning element.

U.S. Pat. No. 2,691,696 discloses a method of enhancing contrast or definition, which corresponds to diffusion masking in photographic reproduction technique. A "surround" signal is obtained in this known method in addition to the image signal, by also scanning the "surround" or surrounding area by means of a commensurately larger surround aperture member apart from scanning the actual image dot by means of an image dot aperture member, forming the differential signal from the surround and image signals and superimposing the same on the image signal in selectable strength as a correction signal for contrast or definition, the effective amplitude of the correction signal being determined by the diameter of the surround aperture member utilised. The increase of contrast or definition is accomplished by the fact that, within the effective amplitude of the correction signal, a dark image portion is recorded darker, and a light image portion lighter, than outside the effective amplitude.

In most instances, the originals which are to be reproduced consist of half-tone images having diffuse outlines, combined with characters or line elements of graphic illustrations having sharply defined outlines.

Since, apart from the preset degree of amplification, the amplitude of the correction signal also depends on the magnitude of a tonal value or image signal change, the contrast is normally accentuated in substantially higher degree on line elements and character outlines (large image signal change) than for outlines in half-tone images (small image signal change). It is however precisely the object in practice to accentuate the detail contrast in half-tone images, since character outlines and line elements are reproduced with sharper definition in any event. In order that the required effect of a contrast accentuation may be secured at all in half-tone images, the available correction signal should operate at full strength. Troublesome white borders or edges which are extremely noticeable, e.g. if black type appears in a grey shade, are formed however in this case on highlights, sharp outlines and around black characters. These borders or edges are particularly troublesome however if the printing block is recorded to a scale larger than the original, since the effective amplitude of contrast accentuation on the recording medium varies with the reproduction scale.

United Kingdom Patent Specification No. 1,546,359 discloses a reproduction device comprising a system for accentuation of contrast or definition in which, for the purpose of adapting the scanned line width to the reproduction scale, the opening of the image dot aperture member are varied as a function of the reproduction scale and the aperture of the surround aperture is also varied at the same time by means of mechanically coupled diaphragm plates, in such manner that the ratio between the diameters of the image dot and surround shutters remains constant. Although these measures may well alter the effective range of the contrast accentuation as a function of the image dot aperture member utilised or of the reproduction scale to the effect of a reduction of the troublesome edges or borders, the known reproduction device still has the disadvantage that the effective range cannot be optimised for special reproduction requirements.

SUMMARY OF THE INVENTION

It is thus a main object of the invention consequently to establish a method whereby it is possible to optimise a contrast accentuation or definition increase.

This and other objects is achieved by setting the effective range of contrast accentuation on the recording medium independently of image dot size and continuously by variation of the width of overlap of the image and correction signals.

Even in case of variation of the recording or scanning definition (line width), the method according to the invention advantageously allows the effective range of contrast accentuation to be optimised under consideration of the original information, e.g. such as character width, in such manner that the troublesome borders or edges remain small and data contamination or weakening is substantially averted or at any rate minimised. The effective range of contrast accentuation may moreover be optimised in preferential manner as regards the sture of the original.

BRIEF DESCRIPTION OF THE DRAWINGS

In order that the invention shall be more clearly understood, reference will now be made to the accompanying drawings which illustrate one particular embodiment thereof by way of example and in which:

FIGS. 4A and 4B show graphs of correction signals produced by electrical control of a threshold circuit.

DETAILED DESCRIPTION OF PREFERRED EMBODIMENT

Figure 1:
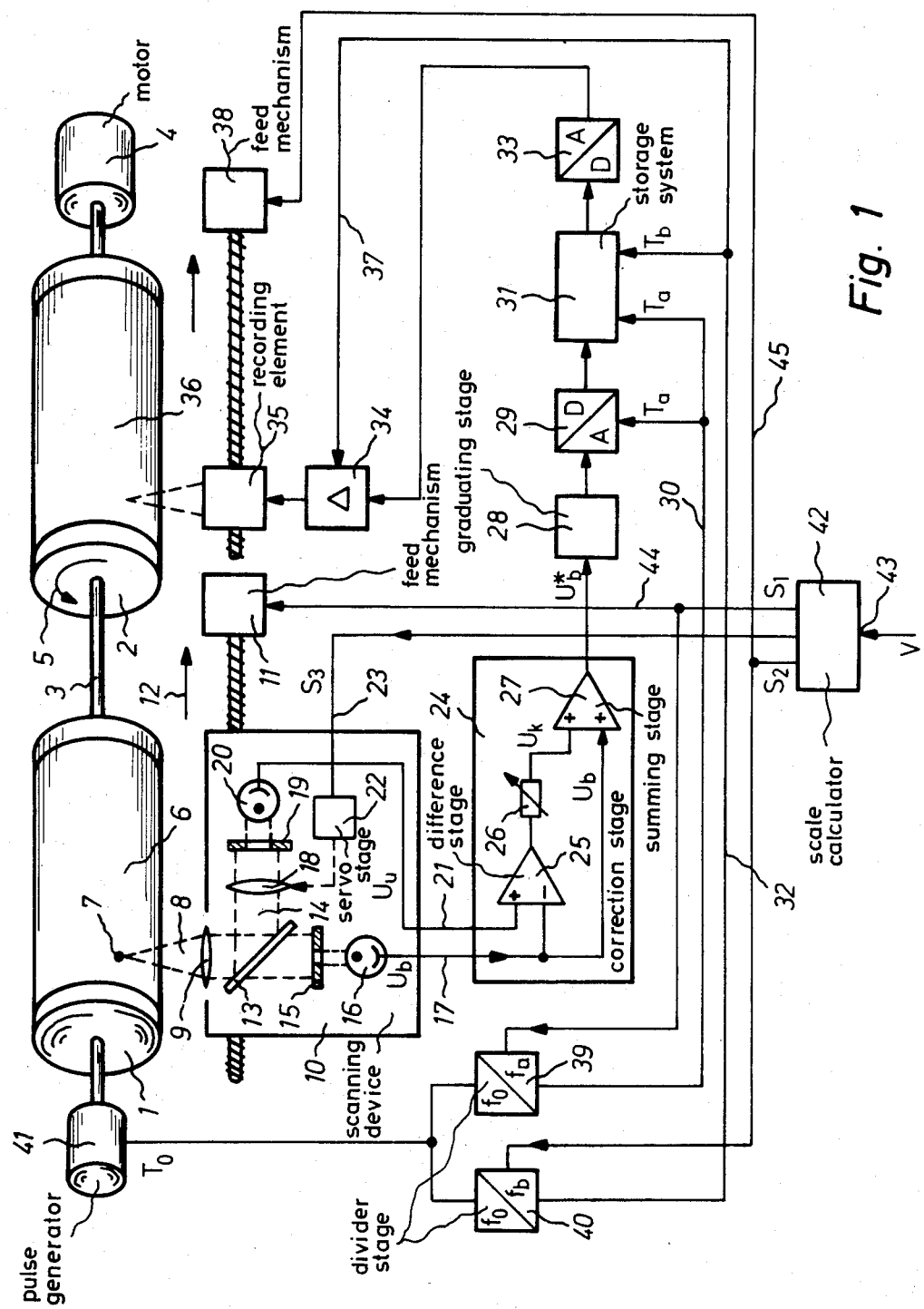
FIG. 1 shows a fundamental circuit arrangement for an image reproduction apparatus, FIG. 2 graphically shows a variable surround shutter or aperture.

Referring now to the drawings FIG. 1 shows a fundamental circuit arrangement of an electronic reproduction apparatus, wherein a scanning drum 1 and a recording drum 2 are coupled mechanically by a shaft 3 and are driven together by a motor 4 in the direction of the arrow 5. An original 6 which may comprise half-tone images, line elements and character outlines, is clamped on the scanning drum 1. The original 6 is scanned dot-by-dot and line-by-line by means of a light spot 7 of a light source which is not illustrated since it is that well-known in the art. In the case of an opaque original it is the reflected light, and in the case of a transparent original the scanning light 8, modulated by the brightness datum of the original 6, which is fed via a scanning lens 9 into a scanning device 10 wherein are generated an image signal $U_b$, and a surround signal $U_u$. The scanning device 10 is moved in steps or continuously past the scanning drum 1 in the direction of an arrow 12 by means of a feed mechanism 11.

In the embodiment illustrated where the scanning device 10 is intended for scanning black and white originals, a semi-transparent mirror 13 which reflects a partial beam 14 from the scanning light 8 is situated in the beam path of the scanning lens 9. The scanning light 8 passing through the semi-transparent mirror 13 is incident via the opening of an image dot aperture member 15 on an opto-electronic transducer 16 which generates the image signal $U_b$ on a conductor 17. In the embodiment shown, the partial beam 14 passes through a zoom lens 18 and a surround aperture member 19 the opening of which is greater than that of the image dot aperture 15, on to another opto-electronic transducer 20 which generates the surround signal $U_u$ on a conductor 21.

The focal length of the zoom lens 18 may be varied by means of a servo-stage 22 by a control signal $S_3$ supplied via a conductor 23. The zoom lens 18 depicts the opening of the surround aperture member 19 on the semi-transparent mirror 13 in differing sizes, and the opto-electronic transducer 20 consequently "sees" surround areas of different size, depending on the control signal $S_3$.

The invention is not limited to the embodiment illustrated of the scanning device 10. Instead of the zoom lens, a controllable iris diaphragm controllable aperture turret or simply different "Waterhouse stops", may also be utilised. A variable surround could also be engendered in advantageous manner without different aperture members by means of a so-called quadrant or segment photodiode acting as an opto-electronic transducer. A photodiode of this kind comprises photosensitive areas in the form of an annulus, which deliver selective signals. The size of the surrounding field may be selected by selection of these signals. If other surround signals based on surrounding areas enlarged as compared to the first surrounding area are generated in the scanning device 10, these could obviously also be made variable. The image dot aperture member could also be arranged to be controllable. It would also be possible to make use of an annular mirror in the optical system instead of the partially transparent mirror, in which the opening in the centre of the mirror and the annular surface determine the surrounding area. For simultaneous pickup of the image dot surround, the scanning device 10 may also be provided with lines or photodiodes or with a photodiode matrix.

Another embodiment of the scanning device 10 comprises a conventional scanning element which merely generates an image signal. The image signal values of several lines or line sections adjacent to the line actually scanned are then placed in intermediate store in line memories or registers post-connected to the scanning element. Finally, the scanning element may also have post-connected to it a so-called whole picture memory wherein are stored all the image signal values of an original. In both cases, the surround signal is calculated from the stored image signal values situated in the surround range. Such surround calculations are known, e.g. from the German Patent Specification No. 21 37 676. Instead of a scanning system for black and white scanning, it will be apparent to those skilled in the art and it is possible to utilise one for colour scanning.

The image signal $U_b$ present on the conductor 17 and the surround signal $U_u$ on conductor 21, reach a corrector stage 24 for contrast accentuation at tonal value changes or outlines, by increasing the image signal changes by means of a correction signal. The correction signal $U_k$ which—by means of a potentiometer 26—is superimposed in selectable strength on the image signal $U_b$ in a summing stage 27 is established by forming the difference between the image signal $U_b$ and the surround signal $U_u$ in a differentiator stage 25. To this end, the period or overlap of the superimposition, referred to as the effective width, depends on the size of the surrounding area or of the surround aperture member 19. Since the size may be altered by means of the control signal $S_3$, the effective width or amplitude of the correctA signal $U_k$ is also advantageously controllable. The enhanced image signal $U_b$ is modified in a post-connected graduation stage 28 according to the requirements of the reproduction process and is then digitalised in an analog/digital transducer 29 by means of a scanning sequence $T_a$ at the frequency $f_a$ on a conductor 30, an image dot or a digital image signal value being allocated to each cycle. For the purpose of scalar variation between the original and the reproduction, the image signal values are registered line-by-line in an image line storage system 31 under control by the scanning cadence $T_a$. The stored image signal values are read out again from the image line storage system 31 with a recording cadence $T_b$ having the frequency $f_b$ on a conductor 32, converted into an analog image signal again in a postconnected D/A transducer 33 and a fed to a recording element 35 via a final amplifier 34. The recording element 35 records the original 6 dot-by-dot and line-by-line, enlarged or reduced according to the scale selected, on a recording medium 36, e.g. film, which is clamped on the recording drum 2. A screen signal derived from the recording cadence $T_b$, which is fed to the final amplifier 34 via a conductor 37, may be superimposed on the image signal $U^x{}_b$ in the final amplifier 34, to produce a printing screen.

The recording element 35 is also displaced axially in the direction of the arrow 12 along the recording drum 2, by means of another feed mechanism 38.

If the image reproduction system is a printing block graving device, the recording element 35 for example may consist of an electromagnetic graving element comprising an engraver's tool as a cutting tool for the screen dots or an energy beam generator the energy beam of which forms the screen dots by the vapourisation of material. If it is a scanner however, the recording element 35 is a light source modulated in respect of brightness by the image signal, which produces a screened or unscreened reproduction on a film material.

The scalar change between the original and the reproduction by a scalar factor V is obtained, according to German Patent Specification No. 11 93 534, by selecting the frequencies $f_a$ and $f_b$ according to the relationship $f_a = V f_b$, and the feeds for the scanning device 10 and the recording element 35 commensurately.

The scanning cadence $T_a$ and the recording cadence $T_b$ are obtained by division of the frequency of a cadence $T_0$ in adjustable frequency divider stages 39 and 40 with the divisional factors $q_1 = f_0/f_a$ and $q_2 = f_0/f_b$. The cadence $T_0$ is produced by means of a pulse generator 41 which is mechanically coupled to the scanning drum 1, so that the cadences are synchronised with the rotary displacement of the drums.

A scale calculator 42 which has the required scalar factor V fed in via a program input terminal 43, generates three control signals $S_1$, $S_2$ and $S_3$. The control signal $S_1$ present on a conductor 44 determines the divisional factor $q_1$ of the frequency divider stage 39 and the feed velocity or step length of the scanning device. The control signal $S_2$ present on a conductor 45 makes provision in accordance with the printing screen which is to be recorded, for the setting of the divisional factor $q_2$ of the frequency divider stage 40 and the correct feed velocity or stepping length (or path) of the recording element 35. The control signal $S_3$ present on the conductor 23 affects-via the servo stage 22—the focal length of the zoom lens 19 and thereby the size of the surrounding area and the scanning-side effective range of the correction signal $U_k$.

The effective range of the correction signal $U_k$ may be determined not only via the size of the surrounding area, but advantageously also by electrical means, e.g. by means of a threshold circuit for the correction signal $U_k$. In this case, the control signal $S_3$ affects the comparison threshold (see FIGS. 4A and 4B).

The recording-side effective range of contrast accentuation which is established from the scanning-side effective range and preset scalar factor V, finally determines the increased or reduced correction range around a tonal value change on the recording medium.

The invention, by varying the scanning-side effective magnitude enables corrective areas of different width to be obtained on the recording medium irrespective of the actual reproduction scale, so that the re-recording of the original as a function of scale may be optimised in advantageous manner regarding suppression or attenuation of troublesome borders or edges. For example, the scanning-side effective magnitude may be so varied as a function of the scalar factor that a constant corrective region is produced independently of scale on the recording medium, which is accomplished if the product of the effective magnitude and the scalar factor is a constant. In the case of enlargements in particular, the borders and edges may be kept so small that they are no longer noticed as an impairment by the observer.

Figure 2:
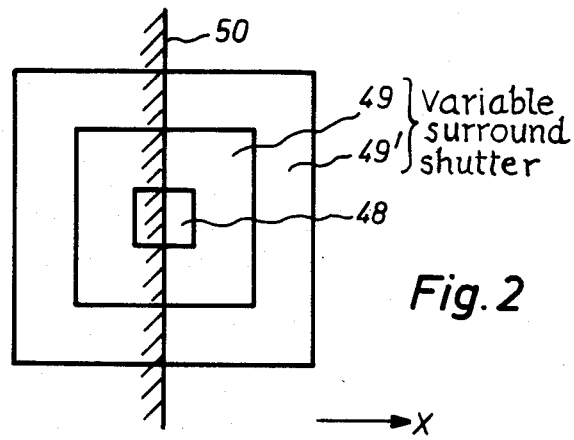

In a graphic illustration, FIG. 2 shows an opening 48 of the image dot aperture member 15 and two openings 49 and 49' of different size of a variable surround shutter of the surround aperture member 19. The shape of the aperture or shutter openings has been assumed to be square. They may for example alternatively have a circular or other optional shape. An outline 50 is indicated on the original 6 moreover (light/dark change) which is to move in the direction X in view of the relative displacement between the original 6 and the scanning device 10.

Figure 3:
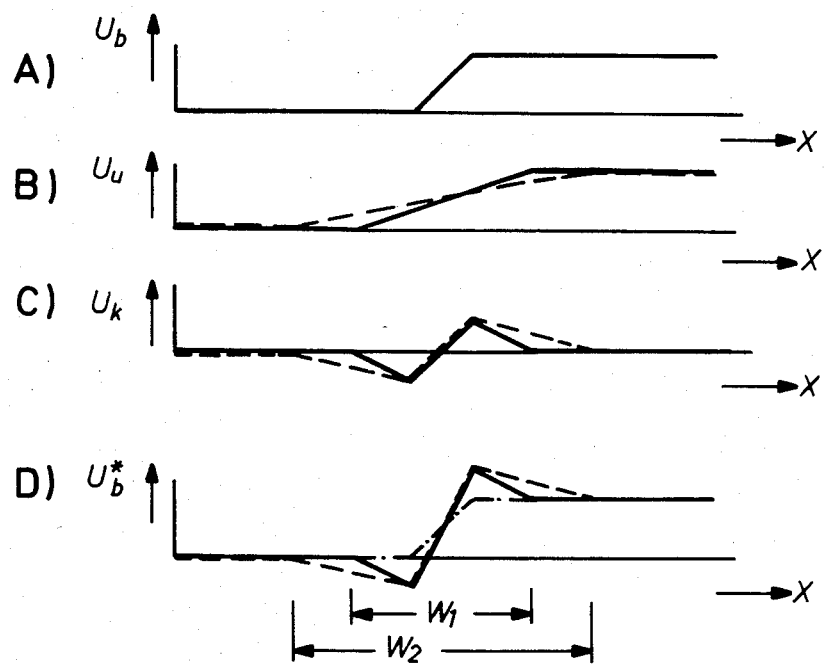
FIG. 3 shows signal graphs.

FIG. 3 shows the corresponding signal graphs as a function of the path x along which the outline 50 moves across the shutter apertures according to FIG. 2.

The image signal $U_b$ is illustrated in graph (A), the surround signal $U_u$ in graph (B), the correction signal $U_k$ obtained by forming the difference between the image and surround signals in graph (C), and the intensified image signal $U_b$ produced by superimposition of the image and correction signals in graph (D), that is for the smaller aperture 49 (solid line) and for the larger aperture 49' of the surround shutter 19 (dash-dotted line). The different effective magnitudes $W_1$ and $W_2$ of the corrective signal $U_k$ on the image signal $U_b$ resulting from the differently dimensioned apertures 49 and 49' of the surround shutter 19 are shown in graph (D) moreover.

I claim:

1. In a method of improving contrast accentuation in electronic reproduction apparatus of the kind in which a composite original comprising both continuous tone areas and linework areas is scanned opto-electronically dot-by-dot and line-by-line to obtain an image signal, at least one surround signal is generated by evaluation of the area surrounding the image dots, and a correction signal which is superimposed on the image signal for contrast accentuation is derived from the surround and image signals, and in which the original is subsequently recorded on a recording medium, the improvement which comprises varying the width of overlap between the image and correction signals continuously, independently of the image dot size, and adjusting said width of overlap to control the effective range of contrast accentuation on the recording medium whereby to optimize the recording of a composite original with substantial elimination of white fringes and edges at the contours of the recorded linework.

2. A method according to claim 1, wherein the effective range of contrast accentuation is adjusted as a function of the scanning resolution.

3. A method according to claim 1, wherein the width of overlap of the image and correction signals is varied by an electronic threshold circuit for the correction signal.

4. A method according to claim 1, in which the original is recorded on the recording medium to a different reproduction scale, wherein the effective range of contrast accentuation is adjusted as a function of the reproduction scale.

5. A method according to claim 4, wherein the adjustment is performed in such manner that the effective range is constant notwithstanding the reproduction scale.

6. A method according to claim 1, wherein the width of overlap between the image and correction signals is varied by the size of the surrounding area.

7. A method according to claim 6, wherein the size of the surrounding area is varied by means of a zoom lens.

8. A method according to claim 1, wherein the surround signal is obtained by complementary scanning of the original by means of a surround shutter, the extension of the shutter aperture in the line direction determining the width of overlap.

9. A method according to claim 8, wherein the product of the aperture diameter and the reproduction scale is constant.

10. Apparatus for the electronic reproduction on a recording medium of composite originals comprising half-tones and line elements, said apparatus comprising first means for opto-electronically scanning image dot areas of said original dot-by-dot and line-by-line to produce an image signal, second means for opto-electronically scanning surrounding areas of the original overlapping successive image dot areas being scanned by said first scanning means to produce a surround signal, means producing a correction signal from the difference between the surround and image signals, means for adjusting the relative strengths of the image and correction signals to a selected value, means for superimposing the correction signal on the image signal at said selected relative strength to provide a recording signal which is processed to record dot-by-dot and line-by-line a reproduction of the original on the recording medium, and means for continuously varying the width of overlap of said surround and image signals, independently of the size of the image dot area scanned by said first scanning means whereby to adjust the effective range of contrast accentuation on the recording medium and optimize the recording of the half-tones with substantial elimination of white fringes and edges at the contours of the recorded line elements.

* * * * *